(12) United States Patent
Thayer et al.

(10) Patent No.: US 6,351,455 B1
(45) Date of Patent: Feb. 26, 2002

(54) SYSTEM TEST METACONTROLLER

(75) Inventors: James D. Thayer, San Diego; David R. Eames, Poway, both of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/055,025

(22) Filed: Apr. 3, 1998

(51) Int. Cl.[7] .......................... G06F 11/00; G06F 15/16; H04B 17/00
(52) U.S. Cl. .................... 370/241; 712/200; 712/216; 714/37; 714/738; 707/3; 455/67.4; 709/249
(58) Field of Search .................... 712/200, 206, 712/215, 216, 220, 230, 248; 714/25, 37, 742, 738; 707/3; 703/3, 6, 13; 717/2, 8; 455/67.4, 423; 702/108, 59; 370/241, 441; 709/224, 227, 249

(56) References Cited

U.S. PATENT DOCUMENTS 5,606,568 A * 2/1997 Sudweeks ................... 714/738
5,894,484 A * 4/1999 Illes et al. ................... 714/738
6,122,671 A * 9/2000 Farrar, Jr. et al. .......... 709/224

* cited by examiner

*Primary Examiner*—Hassan Kizou
*Assistant Examiner*—Afsar M. Qureshi
(74) *Attorney, Agent, or Firm*—Philip Wadsworth; Kent D. Baker; Bruce W. Greenhaus

(57) ABSTRACT

A system test metacontroller including an input device and a processor. The input device accepts a metascript containing commands to control devices which are part of a test arrangement. At least one of the devices is an interactive device responsive to interactive programming instructions, and at least another device is non-interactive. The processor decomposes the metascript into instructions capable of driving the interactive device and the non-interactive device. The invention permits the testing of both interactive and non-interactive devices from one input metascript. The invention should be particularly useful in testing communications networks such as CDMA cellular phone networks.

42 Claims, 10 Drawing Sheets

SYSTEM TEST METACONTROLLER

BACKGROUND OF THE INVENTION

I. Field of the Invention

This invention relates generally to testing hardware. More specifically, this invention relates to a novel and improved system and method for testing communications networks.

II. Related Art

The use of code division multiple access (CDMA) modulation techniques is one of several methods for facilitating communications in systems accommodating a large number of users. Other multiple access communication system techniques, such as time division multiple access (TDMA), frequency division multiple access (FDMA) and AM modulation schemes such as amplitude companded single sideband are known in the art. However, CDMA spread spectrum modulation techniques have significant advantages over other modulation techniques for multiple access communication systems. The use of CDMA techniques in a multiple access communication system is disclosed in U.S. Pat. No. 4,901,307, which issued Feb. 13, 1990, entitled "SPREAD SPECTRUM MULTIPLE ACCESS COMMUNICATION SYSTEM USING SATELLITE OR TERRESTRIAL REPEATERS", and is assigned to the assignee of the present invention, and is incorporated by reference herein in its entirety.

In U.S. Pat. No. 4,901,307, referred to above, a multiple access technique is disclosed where a large number of wireless system users each having a transceiver communicate through satellite repeaters or terrestrial base station transceivers using CDMA spread spectrum communication signals. In using CDMA communications techniques, the frequency spectrum can be reused multiple times thus permitting an increase in system user capacity. The use of CDMA techniques results in a much higher spectral efficiency than can be achieved using other multiple access techniques.

It is desirable to test the performance of the CDMA system. To determine the capacity of a CDMA system, a selected number of subscriber units or load testers may be deployed at various distances from the base station as a means of estimating the interference level corresponding to maximum system capacity. In addition to testing capacity, designers may also test air link, call processing, and network management and maintenance of the CDMA system and its subcomponents.

However, such testing may require the use of both interactive and non-interactive testing devices. An interactive device is responsive to interactive commands while, conversely, a non-interactive device is not. For example, an interactive testing device receives individual commands and acts upon them as in an IEEE-488 bus T1 line simulator. A device controlled by a C program, for example, would be non-interactive since the behavior of the device could not be changed without loading a new C program. Additionally, since various devices are used, a common device script to control all the devices required for a particular test would be convenient. What is needed is a method of using both interactive and non-interactive devices in a single test while providing a convenient single input script for all the devices used to test a system.

SUMMARY OF THE INVENTION

The invention features a system test metacontroller including an input device and a processor. The input device accepts a metascript containing commands to control devices which are part of a test arrangement. One of the devices is an interactive device responsive to interactive programming instructions and another device is non-interactive. The processor decomposes the metascript into instructions capable of driving the interactive device and the non-interactive device.

The invention is useful in simulation testing of communications networks without using actual mobile units. During the simulation, the invention permits testing using both interactive and non-interactive devices with one input metascript. In addition, the language in which the metascript is written provides a convenient testing tool. Instead of writing scripts in multiple languages for various devices, a user may write one script in a single language for all the devices used in the test.

DESCRIPTION OF THE INVENTION

The invention features a system test metacontroller including an input device and a processor. The input device accepts a metascript containing commands to control devices which are part of a test arrangement. One of the devices is an interactive device responsive to interactive programming instructions and another device is non-interactive. The processor decomposes the metascript into instructions capable of driving the interactive device and the non-interactive device. Conventional testing methods have difficulty coordinating testing employing both interactive and non-interactive devices in one test.

The invention is useful in simulation testing of communications networks without using actual mobile units. During the simulation, the invention facilitates testing using both interactive and non-interactive devices with one input metascript. In addition, the language in which the metascript is written provides a convenient testing tool. Instead of writing scripts in multiple languages for various devices, a user may write one script in a single language for all the devises used in the test.

Several operations or steps are described below as performed on a "computer." Those skilled in the art will appreciate that although it may be convenient to perform multiple steps on one processor or central processing unit (C.P.U.), the invention does not require it. Indeed, it may be advantageous to perform some steps on one processor or C.P.U. and other steps on one or more other processors or C.P.U.'s. Therefore, the term computer should be construed to include multiple processors and C.P.U.'s which may be electrically or electromagnetically connected via one or more networks as well as those not connected as in multiple stand alone machines. Of course, data can be transferred between stand alone machines by various machine readable media such floppy disks, tapes, compact discs, hard drives, etc.

For background material, the reader is directed to the following standard textbooks and standards publications all of which are incorporated by reference herein in their entirety: *Electrical Engineering Handbook,* edited by Richard C. Dorf, CRC Press, 1993; *Tcl and the Tk ToolKit,* John Ousterhout, Addison-Wesley, 1994; *Design and Construction of Compilers,* Robin Hunter, Wiley, 1981; *Computer Network,* Andrew Tanenbaum, Prentice-Hall, 1981.

Figure 7:
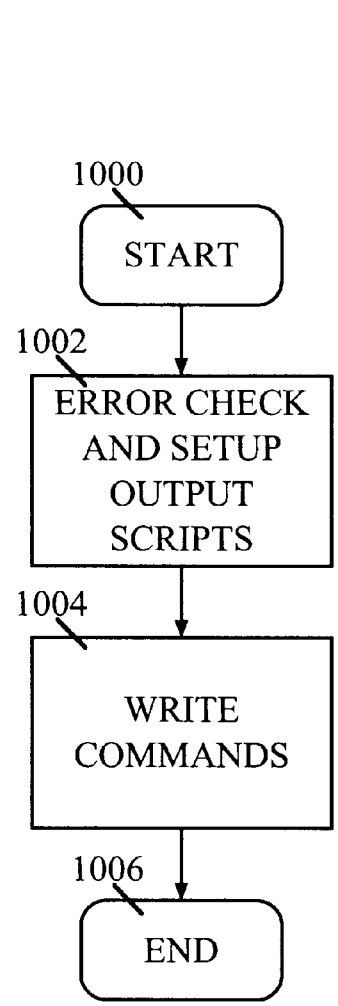
FIG. 7 is a flowchart of a computer program illustrating in greater detail step 608 of decomposing the metascript via embedding shown in FIG. 6 in accordance with the present invention.
Figure 8A:
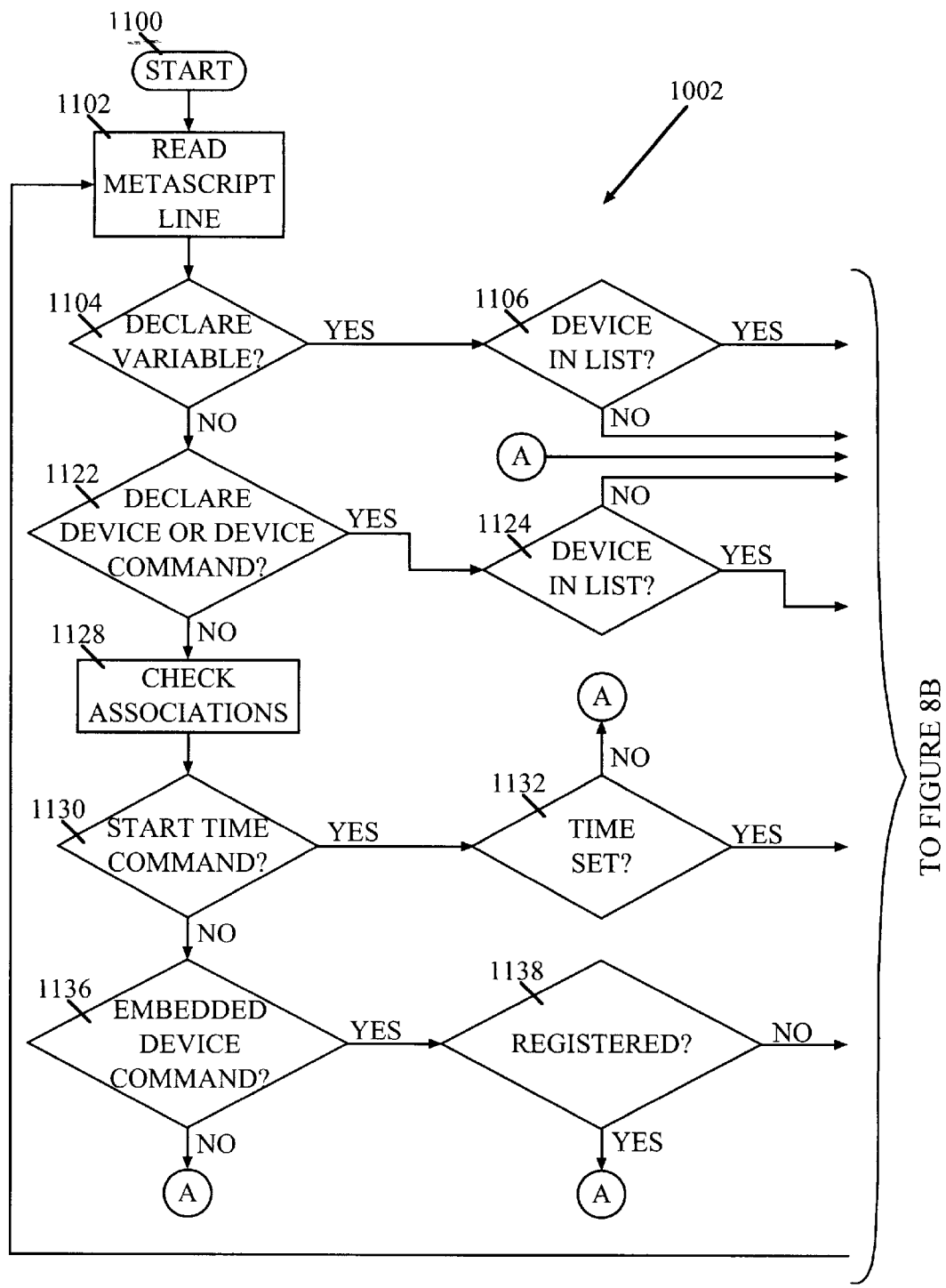
FIG. 8 is a flowchart of a computer program illustrating in greater detail step 1002 of error checking and setting-up output scripts shown in FIG. 7 in accordance with the present invention.
Figure 8B:
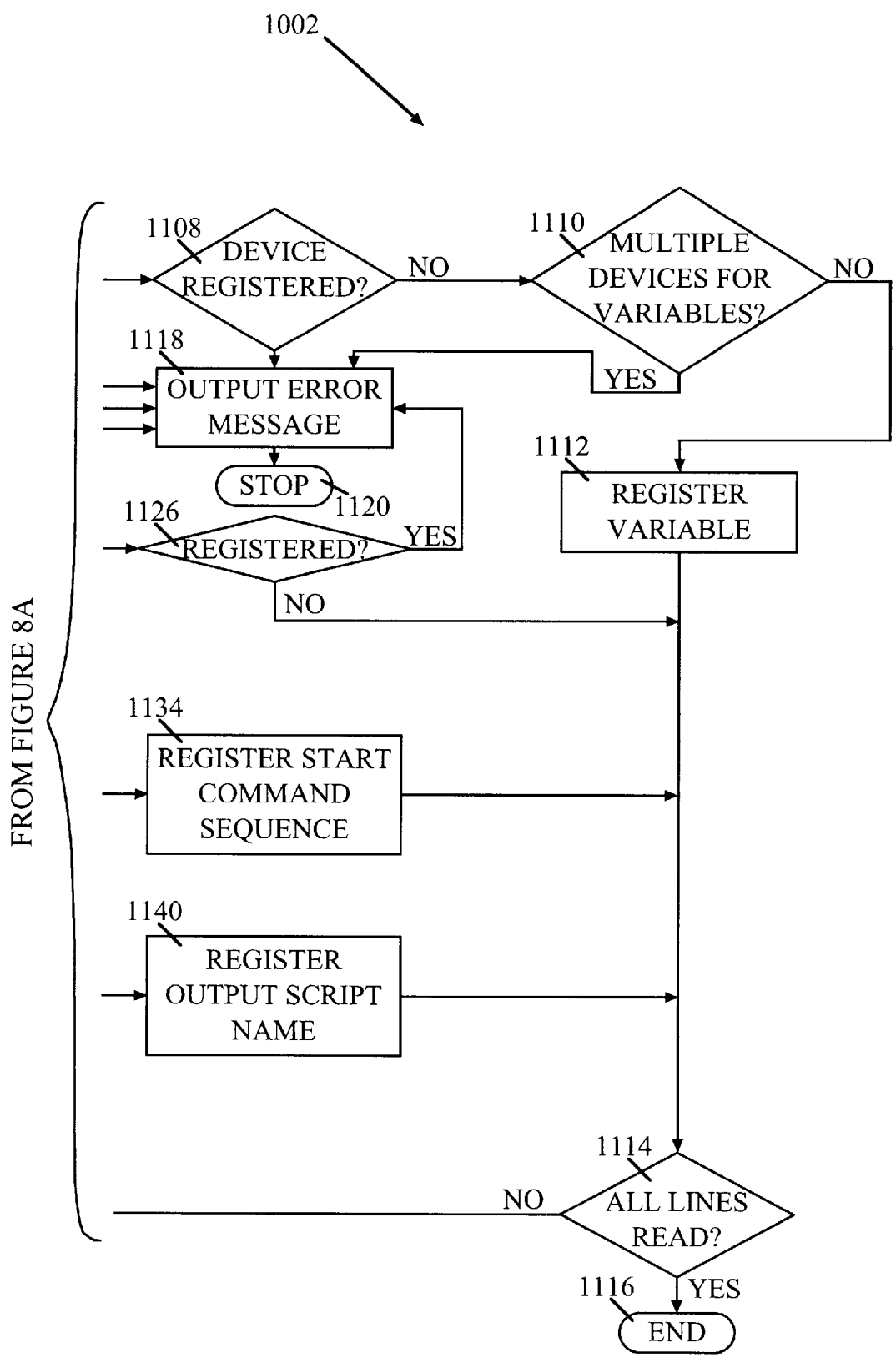
Figure 9:
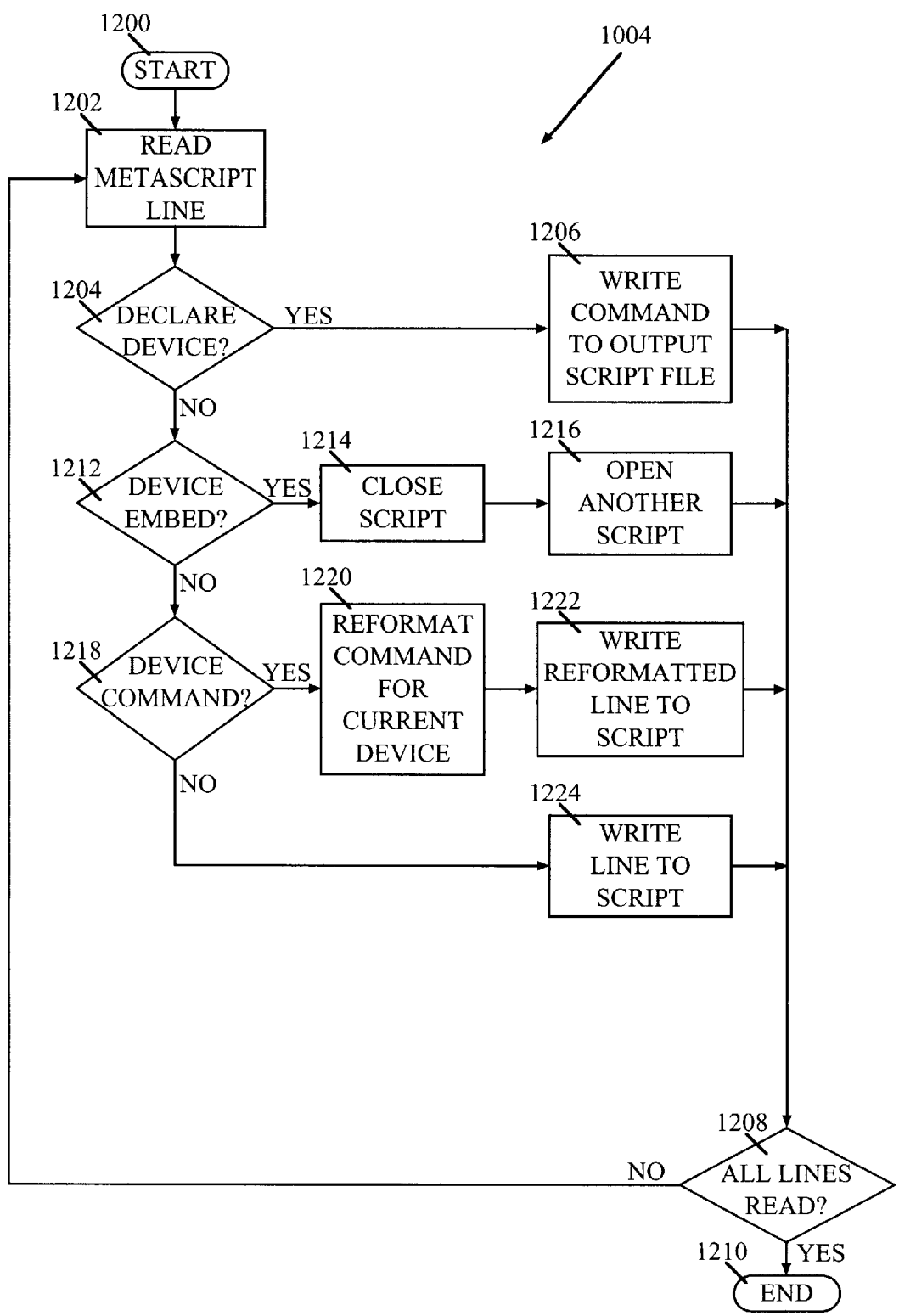
FIG. 9 is a flowchart of a computer program illustrating in greater detail the step 1004 of writing commands shown in FIG. 7 in accordance with the present invention.

First, an exemplary test environment requiring coordination of both interactive and non-interactive devices will described with reference to FIG. 1A. A test environment with two interactive devices will be described with reference to FIG. 1B. Then, a hardware embodiment of a system for testing a communications network the system test metacontroller is described with reference to FIG. 2. A hardware embodiment of the system test metacontroller is discussed with reference to FIG. 3. Overall functionality of the system test metacontroller with reference to FIGS. 4 and 5 will be described. Then, a description of a method of testing a communications network including a method of metascript decomposition will be described with reference to FIGS. 6–9. FIGS. 7–9 will focus on embedding decomposition of the metascript. An example of an embedding decomposition of a metascript is given at the end of the specification. The example lists the input metascript, an output execution script, and output configuration and script files for two base station load testers (BLT's).

Figure 1A:
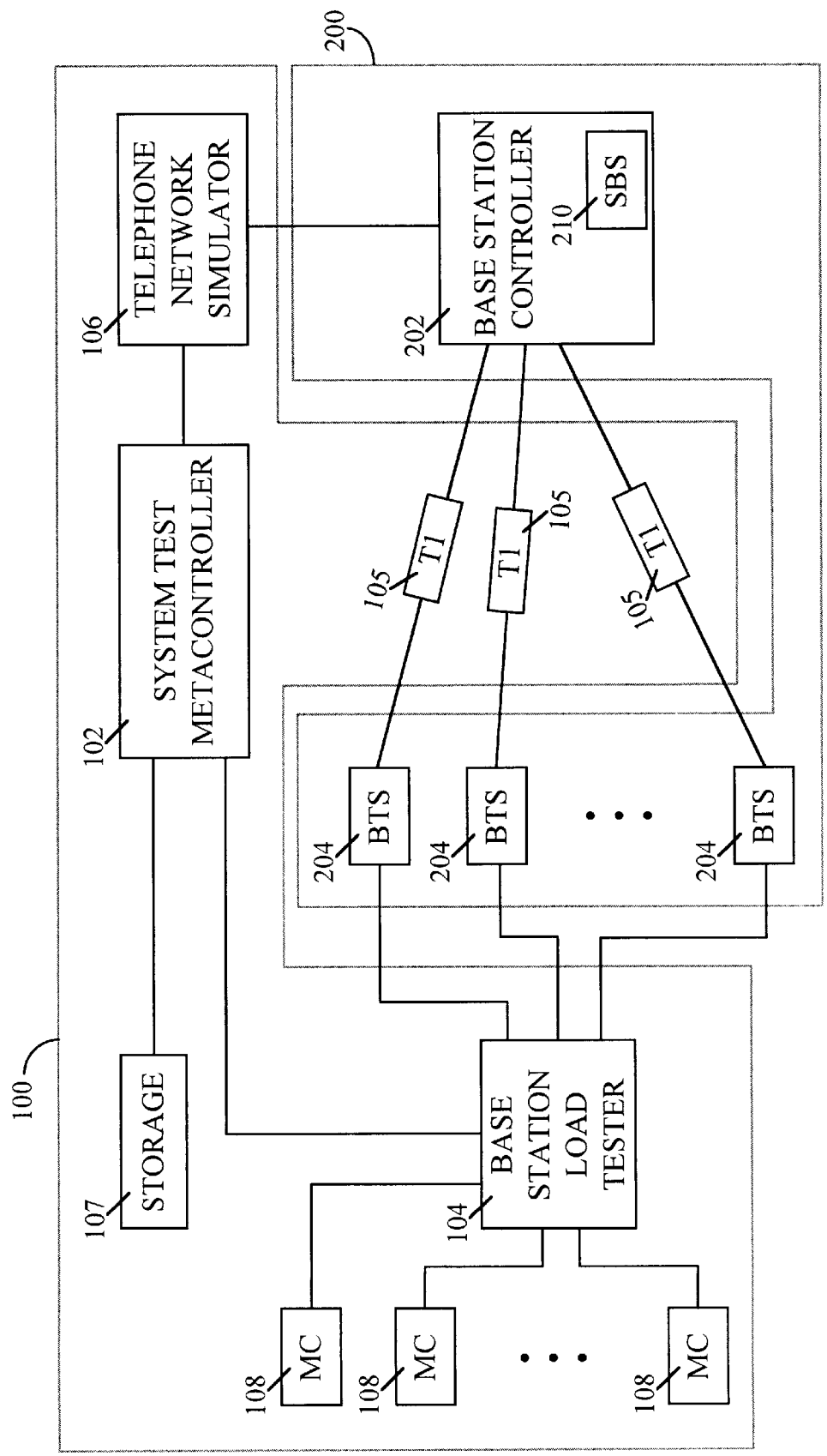
FIG. 1A is a diagrammatic representation of a test arrangement, an embodiment of a system for testing and a communications network under test.

FIG. 1A diagrammatically illustrates a system 100 testing a communications network infrastructure 200. By using the system 100 to test the communication infrastructure 200, the invention obviates the time and expense of using actual telephone calls with mobile communicators, e.g. mobile phones, which move about over large geographical areas.

The system 100 has a system test metacontroller 102 in communication with a base station load tester 104, a telephone network simulator 106, T1 line simulators 105, and mobile communicators 108. The mobile communicators 108 are connected directly to BLT 104. The system test metacontroller 102 is also in communication with communications network infrastructure 200. The system test metacontroller 102 accepts a metascript 400 containing commands to control devices of the infrastructure 200. (See FIG. 4 below.) In some embodiments, the system test metacontroller 102 is coupled to a storage device 107. The metascripts which are input to the system test metacontroller 102 are stored in the storage device 107. The system test metacontroller 102 decomposes the metascript 400 into instructions capable of driving interactive and non-interactive devices of the system 100 and of the communications network infrastructure 200.

During testing, the metacontroller 102 directs the telephone network simulator 106 to generate test signals which are input to the communications network infrastructure 200. The test signals are received by a base station controller 202 which is a subsystem of the infrastructure 200. The base station controller 202 acts under the direction of the system test metacontroller 102 to route the test signals to one or more number of cell site controllers. Each cell site controller is typically part of a base station transceiver subsystem (BTS) 204. Each BTS 204 has one or more antennas to broadcast the test signal to mobile communicators 108.

However, during testing, the BTS's 204 and the mobile communicators 108 are connected directly to the BLT 104 testing device. The base station load tester 104 communicates with one or more of the BTS's 204 and trades off communication among the BTSs 204 just as a mobile telephone would shift communication between the BTSs 204 as the telephone is moved geographically. Essentially, the BLT 104 connects various of the BTS's 204 with various mobile communicators 108. Additionally, the BLT 104 mimics degradation, such as interference, of signals and information transferred between the BTS's 204 and the mobile communicators 108 in an actual field deployment of the communications network 100.

The base station load tester (BLT) 104 is an example of a non-interactive device. The BLT 104 is "non-interactive" since its behavior cannot be changed until a full sequence of commands have executed. For example, a script for the BLT is typically a C program. Once the C program is compiled and loaded, the behavior of the BLT cannot be changed without loading a new C program.

In the actual field deployment, T1 lines, under the IEEE-488 bus standard, connect the base station controller 202 to each BTS 204. T1 lines provide fast exchange of signals and information between the BSC 202 and the BTS's 204. However, these T1 lines are typically several miles long. Therefore, their ability to transfer signals and information between the BSC 202 and the BTS's 204 is subject to degradation such as interference. During testing in a laboratory, a T1 line simulator 105 is connected between the BSC 202 and each BTS 204 to simulate the actual effects upon communication of the long T1 connections in the actual field deployment.

The IEEE-488 bus T1 line simulators 105 are examples of interactive devices. Each command is sent individually to each T1 line simulator 105. As a result, the behavior of each T1 line simulator 105 may be changed without reprogramming it.

The test environment in FIG. 1A has both non-interactive devices and interactive devices; as described above, the base station load tester 104 is non-interactive, and the T1 line simulators 105 are interactive. This testing arrangement is difficult to implement by conventional techniques because conventional techniques cannot coordinate the simultaneous usage of both non-interactive and interactive devices. Clearly, the inclusion of the BLT 104 and the T1 line simulators 108 in a single test can more thoroughly test the communications network 200. The invention has an advantage over conventional hardware, software, and testing methods of permitting testing when both non-interactive and interactive devices are in the same test environment.

The communications network infrastructure 200 under test in FIG. 1A may have many other components other than those shown. For example, there may be other controllers within the base station controller 202 and the BTSs 204.

In some situations it may be desirable to test a single component or device within the base station controller 202 instead of the entire base station controller 202. This might occur, for example, when other components of the base station controller 50 are not available for construction of the entire base station controller 202. A selector bank subsystem (SBS) 210 is a typical component of the base station controller 202 that may require separate testing.

Figure 1B:
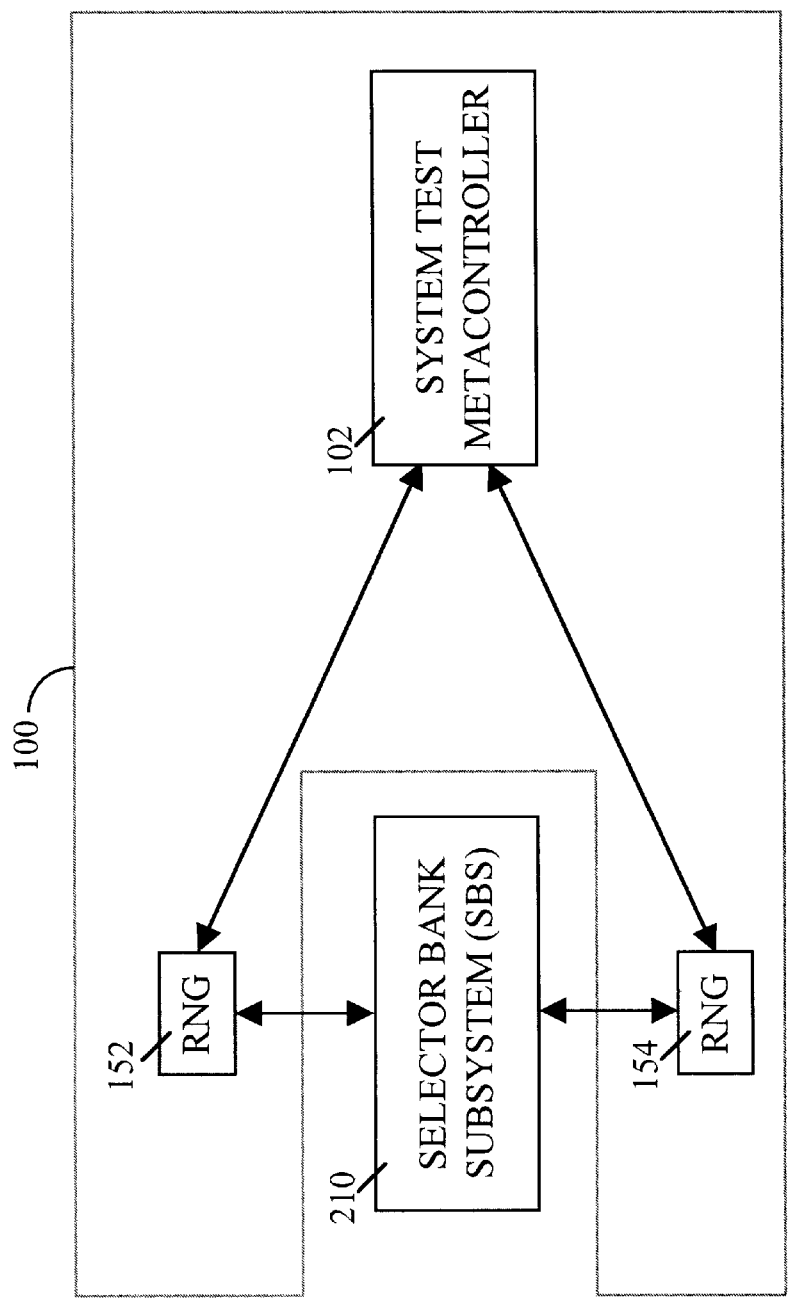
FIG. 1B is a diagrammatic representation of a test arrangement, an embodiment of a system for testing and a communications network under test.

FIG. 1B diagrammatically illustrates usage of the system test metacontroller 100 when a selector bank subsystem (SBS) 210 is the system under test. In this configuration, the system 100 includes the system test metacontroller 102 and operational message generators (RNG's) 152, 154. The system test metacontroller 102 controls the RNG's 152, 154. By inputting appropriate signals into the SBS 210 and responding to signals from the SBS 210, the RNG's 152 and 154 simulate other parts of a system, including other components of the base station controller 202, with which the SBS 210 interacts. The RNG's 152, 154 are not actual components of a communications network infrastructure 200 but are devices used to test the SBS 210. The test environment shows how the system test metacontroller 102 can controller multiple interactive devices such as the RNG's 152, 154 in addition to the mixed interactive/non-interactive environment of FIG. 1A. Note that the devices controlled by the metascript 400 and the metacontroller 102 may be a mixture of devices in both the system 100 and the communications network 200.

Figure 2:
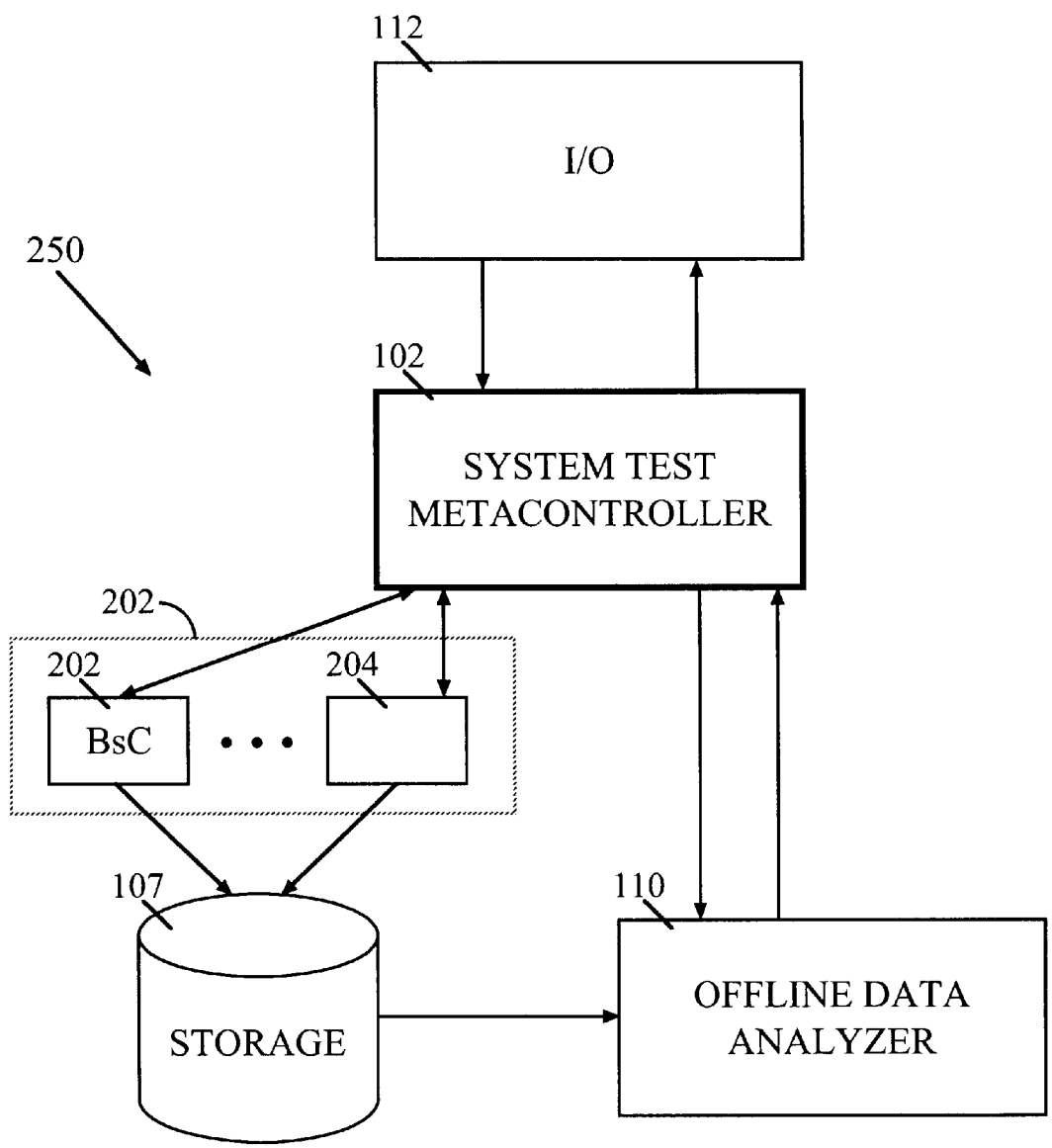
FIG. 2 is a diagrammatic representation of a system for testing a communications network.

FIG. 2 is a diagrammatic representation of another embodiment 250 of the system for testing a communications network. During testing, various devices (subsystems or components) of the base station controller 202 typically generate log files of raw data recording events. Raw data output from the subsystems resulting from testing may be stored in storage 107 or output to the system test metacontroller 102.

In some embodiments, the analyzer 110 retrieves the raw data from the storage 108 and analyzes the raw data. The analyzer's functions are performed by a computer or software on a computer. Essentially, the analyzer 110 correlates events recorded in the various log files to reconstruct an overall sequence of events occurring within the base station controller 202 and determine its functionality. To permit the results of the testing to be observed by a user, the analyzed data may then be sent to the system test metacontroller 102 and output via an input/output device 112. Many possible embodiments of the input/output device 112 are compatible with the present invention such as serial and parallel interfaces to various controllers or devices connected to the system test metacontroller 102. In some embodiments, the input/output device includes a keyboard 112A or monitor 112B to facilitate entry of the metascript 400 into the system test metacontroller 102. Alternatively, when the raw data is sent to the system test metacontroller 102 directly, the system test metacontroller 102 may analyze the data before output by the input/output device 112.

In either case, an execute command may initiate the analysis. The execute command is issued, for example, when testing has been completed, and the desired raw data has been generated. For example, the system test metacontroller 102 may generate an execute command and send it to the analyzer 110 to begin analysis or processing of the raw data. In other embodiments, an execute command will be received by the system test metacontroller 102 via the input/output device 112. The execute command may be input by a user which could include a human or electronic equipment such as a robot or circuit.

Figure 3:
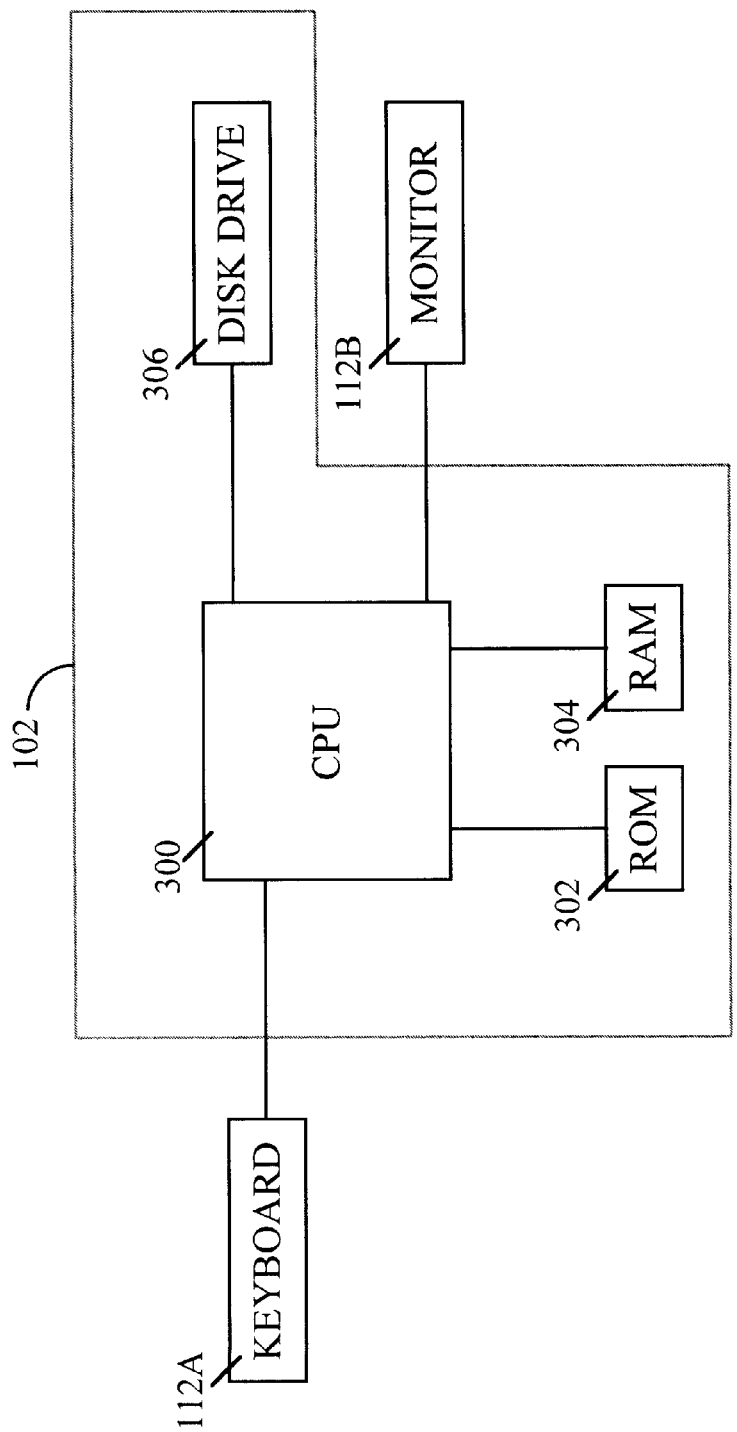
FIG. 3 is a diagrammatic representation of an embodiment of a system test metacontroller.

FIG. 3 is a diagrammatic representation of an embodiment of the system test metacontroller 102. The embodiment of the system test metacontroller 102 in FIG. 3 includes a central processing unit (CPU) 300 connected to a read-only memory (ROM) 302, random access memory (RAM) 304, and a disk drive 306. In some embodiments, the system test metacontroller 102 may simply include the CPU 300 with the memory devices. The input/output device 112 of FIG. 2 is shown in FIG. 3 as including a keyboard 112A and a monitor 112B. Both the keyboard 112A and the monitor 112B are connected to the CPU 300. In this embodiment, a metascript 400 (see FIG. 4) may be entered by a user via the keyboard 112A.

A suitable language for the metascript 400 is the tool command language (TCL) although other computer languages, such as Perl and REXX, may be used. Background material on TCL can be found in *Tcl and the Tk ToolKit*, John Ousterhout, Addison-Wesley, 1994, referenced above.

The CPU 300 accepts the metascript 400 containing commands to control subsystems of the communications network infrastructure 200 under test. As described above, one of the devices in the test arrangement is an interactive device responsive to interactive programming instructions and another device is non-interactive. The CPU 300 decomposes the metascript 400 into instructions capable of driving both the interactive and non-interactive devices in the test arrangement.

In some embodiments, the processor determines which of the devices is interactive and which is non-interactive by sensing identification signals received from each of the subsystems of the communications network infrastructure 200. The CPU 300 may send query signals to the device in the test arrangement. Then, the identification signals include responses to the query signals. When the system test metacontroller 102 determines which devices are interactive and which are non-interactive, the CPU 300 may write the metascript 400 based on the identification signals instead of receiving it via an input/output device 112 such as through the keyboard 112A. In this case, the CPU 300 may store the metascript 400 in memory, such as the RAM 304 or the disk drive 306, for future use and accept another metascript 400 via the keyboard 112A.

The CPU 300 may compile a portion of the metascript 400 for a non-interactive device. Alternatively, the CPU 300 sends a portion of the decomposed metascript 400 directly to the non-interactive device. The CPU 300 may alternatively, or in addition, interpret a portion of the metascript 400 containing instructions to control an interactive device.

The system test metacontroller 100 coordinates execution times for interactive and non-interactive device scripts by setting a maximum execution time. Interactive device scripts by themselves have a natural end time because the user can react to the responses of the various communications network subsystems to the user's commands. However, an end time of a non-interactive device script, such as a compiled computer program, can be ill-defined. A maximum execution time for the test is computed by calculating a maximum time for execution for statements in the scripts resulting from decomposing the metascript 400.

By placing all the non-interactive devices in one script, the testing is generally easier to coordinate. A decomposition provided by the invention may place all the interactive device scripts in one script and each non-interactive script in a separate script for each non-interactive device or class of non-interactive devices.

In some embodiments, the CPU 300 stores raw data in the RAM 304 or the disk drive 306. This data can either be analyzed by the CPU 300 directly before storage or retrieved from memory for later analysis upon by the CPU 300 receipt of an execute command. The analysis by the CPU 300 is the same as the analysis of the analyzer 110 in FIG. 3, e.g., the CPU 300 correlates log files generated by various test devices. The execute command may be received via the keyboard 112A. The results of the analysis may be displayed on the monitor 112B or stored in the RAM 304 or the disk drive 306.

In some embodiments, the CPU 300 may write another metascript based on the results of the analysis. For example, testing via the original metascript 400 could result it the system under test logging faults or errors in functionality. To further probe the faults or errors in the same system or in a new system, the CPU 300 may write another metascript. Attempting to execute the commands for the interactive and non-interactive commands directly in response to results of testing is a very difficult task. Instead, the CPU 300 stores the new metascript for future testing. The new metascript may be stored in a RAM 304 or on the disk drive 306. The new stored metascript may then be retrieved and decomposed for future testing.

Alternatively, the CPU 300 may decompose the new metascript without storing it in memory. In either case, when the new metascript is decomposed, raw data is generated in response to instructions in the new metascript, and analysis of the new data is performed. Examples of raw data include information about messages transferred between the various devices during testing, such as when a message is sent, the devices from and to which the message is sent, and the content of the message. Another example of raw data is a CDMA analogue of "signal-to-noise" ratio logged as raw data via data ports of mobile communicators 108 (such as mobile telephones).

In some embodiments, the processor 300 may produce an error-flag when an unknown subsystem of the communications network infrastructure 200 executes. This may happen, for example, when the metascript 400 is decomposed into instructions which are not compatible with the particular embodiment of the communications network infrastructure 200 or the system 100. This may indicate that the original metascript 400 was improperly written or the system test metacontroller 102 has malfunctioned.

In some embodiments, the metascript 400 may contain instructions to be executed by the CPU 300 instead of the subsystems of the communications network infrastructure 200. Of course, this may occur when the CPU 300 performs analysis instead of the analyzer 110.

The CPU 300 coordinates when instructions are executed by the subsystems in the communications network infrastructure 200 and components of the system 100. The CPU 300 does this by creating and executing an execution script 402 containing commands executable by multiple devices. (See FIG. 4 below.) In some embodiments, the CPU 300 makes the interactive and the non-interactive devices begin execution of their instructions at the same time, and in other embodiments, the CPU 300 makes one of the interactive or the non-interactive devices begin execution of its commands before the other.

An example of such coordination is in a test environment for a load test requiring a BLT 104, a mobile air-linked transceiver system (MALTS) 418, and mobile communicators 108. The MALTS 418 provides a high level of a background load essentially deliberately injecting background noise into the communications network. The BLT 104 provides a simulation of additional loading of the communicators network and are connected to the mobile communicators 108. The user may want to test the communications network with these conditions for a range of background loads by the MALTS 418.

The load test for this test environment is greatly facilitated by coordination of the BLT 104 and the MALTS 418 to achieve simultaneously the desired loading and test the effects of calls using the mobile communicators 108. The BLT 104 is a non-interactive device while the MALTS 418 is interactive. The MALTS 418 is interactive because it can take input data specifying a background load and use the input data to choose which branch(es) of a MALTS script are executed by the MALTS 418. If the user is not able to choose which MALTS background is used with the BLT 104 executing a non-interactive set of commands, then the load test is difficult to perform.

In some situations, the metascript 400 is decomposed by the CPU 300 into a command script in a command language. The command language is one that is utilizable by one of the subsystems in the communications network infrastructure 200.

Figure 4:
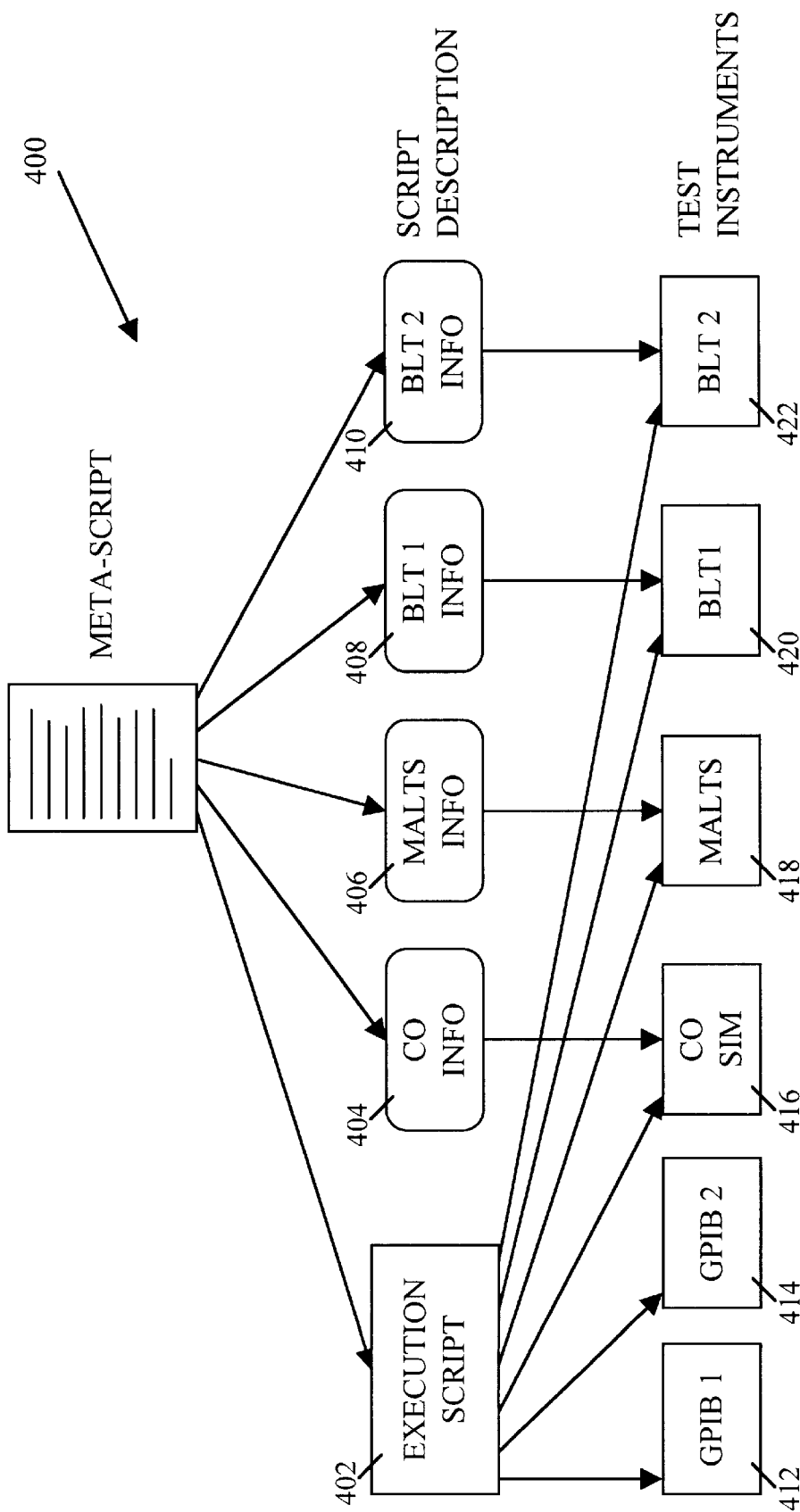
FIG. 4 is a flowchart illustrating a decomposition of a metascript.
Figure 5:
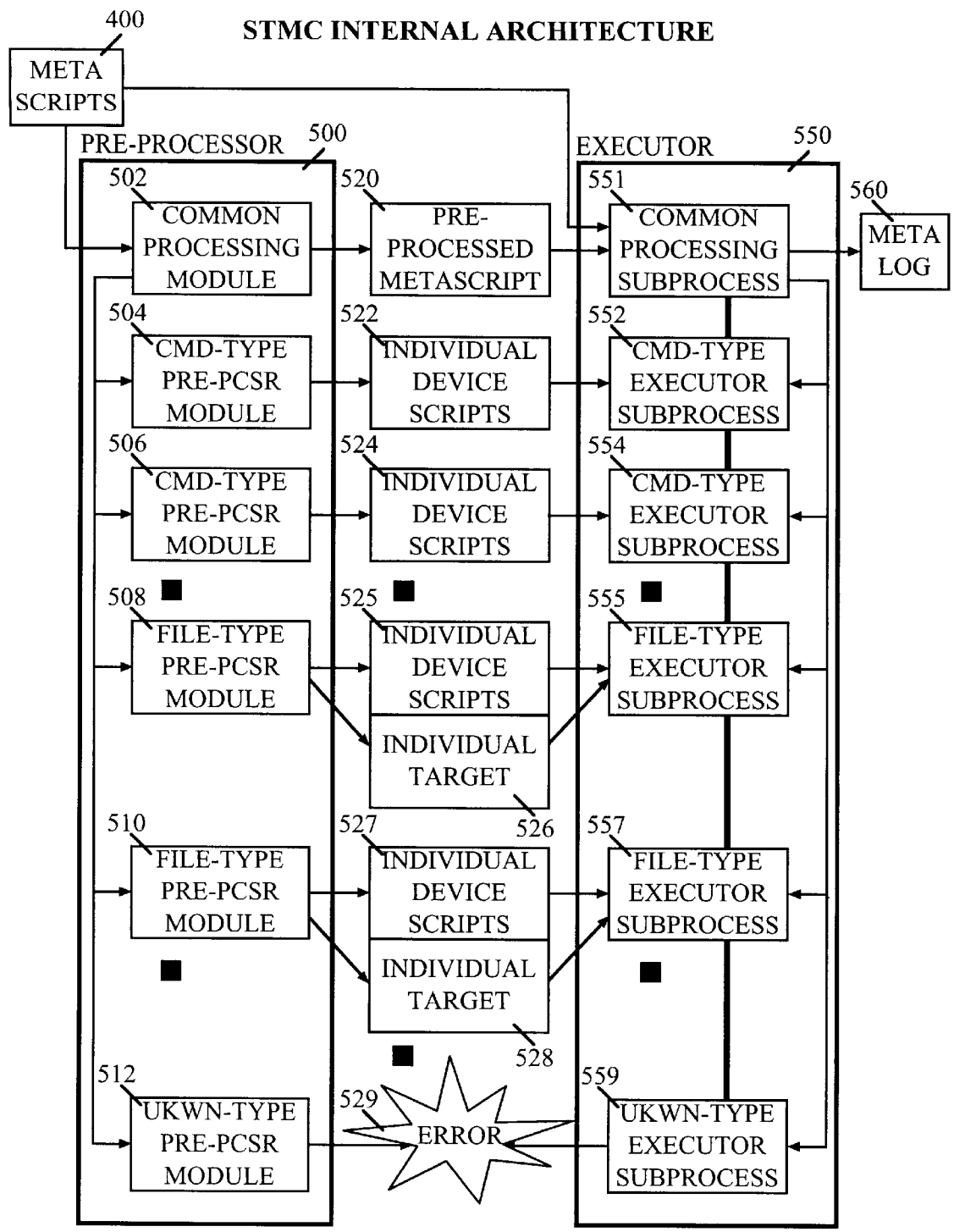
FIG. 5 is a flowchart illustrating a decomposition of a metascript.

FIGS. 4 and 5 illustrate decompositions of the metascript. FIG. 4 describes the overall functionality of the system test metacontroller 102 as a flowchart illustrating a decomposition of the metascript 400 in accordance with the present invention. In the particular decomposition shown, the metacontroller 100 decomposes the metascript 400 into an execution script 402 and information for various devices of the infrastructure 200 and the system 100. The information generally includes both individual device scripts as well as other files such as configuration files specifying a test setup. Depending upon the embodiment, the individual device scripts may be in device specific forms such as an assembly language for a particular device. For the particular example listed at the end of the specification, individual device scripts for BLT's happen to be in a computer language readable by the BLT's as well as human computer programmers. This is generally not the case. The particular decomposition in FIG. 4 shows central office information 404, mobile air-linked transceiver system (MALTS) information 406, and information 408 and 410 for two distinct load testers. This decomposition is only exemplary and does not preclude fewer or more devices than those shown in FIG. 4.

Essentially, the execution script 402 coordinates the test by controlling multiple test devices. The execution script 402 contains commands which are executable by more than one subsystem or device used in testing the communications infrastructure 200. In FIG. 4 portions or all of the execution script 402 are sent to a general purpose interface bus (GPIB) 412, a second GPIB 414, a central office (CO) simulator 416 typically included in a telephone network simulator 106, a MALTS 418, a load tester 420, and a second load tester 422. The GPIB's 412 and 414 here represent devices that can be controlled such as those in accordance with the IEEE-488 standard. Examples of these GPIB devices 412 and 414 include voltage sources, frequency sources, T1 line simulators 105, voltmeters, etc. In some embodiments, the system test metacontroller 402 executes a portion or all of the execution script 402.

The central office information 404, mobile air-linked transceiver system (MALTS) information 406, and load tester information 408 and 410 contain device-specific commands. As described above, the subsystems of the communications network infrastructure 200 may receive data from the telephone simulator 106 instead of from the metascript 400. Corresponding data is loaded from the CO information 404, MALTS information 406, load tester information 408 and load tester information 410 into the CO simulator 416, the MALTS 418, the load tester 420 and the load tester 422.

FIG. 5 is a flowchart of a decomposition of the metascript 400. The metascript 400 may be input into either a pre-processor 500, i.e. a "decomposer", or directly into an executor 550. The preprocessor's functions are performed by the system test metacontroller 102. The executor contains controllers executing the individual device scripts and the execution script 402. Since the system test metacontroller 102 executes part or all of the execution script 402, the executor 550 may contain the system test metacontroller 102 in addition to the device controllers such as controllers in the GPIB's 412, 414, the CO simulator 416, the MALTS 418, and the load testers 420, 422.

The pre-processor 500 (system test metacontroller 102) receives an input metascript 400 and outputs individual device scripts and individual device information to drive the individual devices and hence test the system under test 200. As an alternative to using the metascript 400, individual device scripts may be input directly to the executor 550.

First, the case of the metascript 400 input to the pre-processor 500 will be described. Second, the case of the metascript 400 into the executor 550 will be described. Lastly, as an alternative to using the metascript 400, individual device scripts may be input the executor 550.

The pre-processor 500 (system test metacontroller 102) "interprets" lines of the metascript 400. A "compiler" interprets computer programs for a computer. See *Design and Construction of Compilers,* Robin Hunter, Wiley, 1981, referenced above. Computers "interpret" lines of computer programs, such as the metascript 400, by comparing characters and groups of characters in lines of computer programs with lists or tables of the characters and groups of characters. Often this process can be performed by a process of elimination. When a character or group of characters in a computer line matches a character or group of characters in the lists or tables, an action is taken by the computer corresponding to the character or group of characters.

Within the pre-processor 500, the metascript 400 is input to a common processing module 502. The common processing module 502 determines whether the portion of the metascript 400 being processed is a pre-processed (compiled) metascript 520 or requires compilation. Each command in the metascript language is associated with a device. For each device, the metascript language has a list of compiled and uncompiled commands allowed for the device. The system test metacontroller 102 compares characters and groups of characters in lines within the metascript 400 with a list of allowed compiled and uncompiled commands for each device to determine whether the metascript 400 requires compilation. Background material on this type of determination can be found in *Design and Construction of Compilers,* Robin Hunter, Wiley, 1981, referenced above.

If no compilation is required, the pre-processor outputs the pre-processed metascript 520. The pre-processed metascript 520 includes the execution script 402. An example execution script 402 is listed at the end of the specification incorporated herein by this reference. Otherwise, when compilation is required, the metascript 400 is input to both command-type pre-processor modules 504, 506 and file-type pre-processor modules 508, 510. If the portion of the metascript input to the common processing module 502 is not identified, it is input to an unknown type pre-processor module 512 which executes an error sequence 529.

The command type pre-processor modules 504, 506 recognize commands for writing command language scripts for the individual subsystems which are part of the communications infrastructure 200. To recognize the commands, the command type pre-processor modules 504, 506 compare characters and groups of characters in lines within the metascript 400 with the list of recognizable commands. Background material on this type of recognition of commands can be found in *Design and Construction of Compilers,* Robin Hunter, Wiley, 1981, referenced above.

In some embodiments, the metascript 400 will contain macros in the metascript language directing the command-type pre-processor modules 504, 506 to create command language scripts. Macros are groups of lines in the metascript language. By placing a name of a macro in a metascript line, the groups of lines in the metascript language are incorporated into the metascript corresponding to the macro name. One use of macros is to easily write multiple metascripts for separate tests while using the same statements, incorporated by the macro, to setup one test arrangement of devices.

The command-type pre-processor modules 504, 506 produce individual device scripts 522 and 524. The individual device scripts 522, 524 are examples of the various information files 412, 414, 416, 418, 420, and 422 illustrated in FIG. 4. The individual device scripts 522, 524 are input to command-type executor subprocesses 552 and 554 which are part of the executor 550. The command-type executor subprocesses 552, 554 permit the devices of the system 100 and of the communications network infrastructure 200 to run under the individual device scripts 522, 524.

The file-type preprocessor modules 508 and 510 decompose the input metascript 400 into individual device scripts 525 and 527 and individual target files 526 and 528. A method of decomposition will be described below with reference to FIGS. 6–9. The individual device scripts 525 and 527 are scripts containing commands for individual test controllers. Files blt_1.scr and blt_2.scr at the end of the specification are examples of the individual device scripts 525, 527 incorporated herein by this reference. The individual target files 526 and 528 are download-ready forms of programs executable by the corresponding individual devices (controllers). Configuration files specifying a test setup, such as the BLT configuration files, blt_1.ctg and blt_2.ctg, at the end of the specification, incorporated herein by this reference, are examples of the individual target files 526 and 528.

In the example shown in FIG. 5, the individual device script 525 is paired with the individual target file 526 corresponding to a test controller for a particular device, and the individual device script 527 is paired with the individual target file 528 corresponding to another test controller for another device. Each pairing 525, 526 and 527, 528 is an example of one of the various information files 412, 414, 416, 418, 420, and 422 illustrated in FIG. 4. While each individual device script is paired with a corresponding individual target file for the same test controller in FIG. 5, not every metascript decomposition requires both an individual test script and an individual target file for every test controller.

The individual device script 525 and the individual target file 526 are input to a file-type executor subprocess 555 for a test controller, and similarly, the individual device script 525 and the individual target file 526 are input to a file-type executor subprocess 557 for another test controller. The file-type executor subprocesses 555 and 557 on two separate test device controllers execute the individual device scripts 525, 527 and individual target files 526, 528. The execution of the individual device scripts produces raw data.

The case of the metascript 400 input into the executor 550 will now be described. As noted above, the executor contains controllers, such as the individual device controllers and the system test metacontroller 102, executing the individual device scripts and the execution script 402. The common processing module 551 instantiates command-type executor subprocesses 552, 554 and file-type executor subprocesses 555, 557 and properly distributes scripts for individual devices among the subprocesses 552, 554, 555, and 557. If the portion of the metascript input to the common processing subprocess 551 is not identified as corresponding to a device in the test arrangement, it is input to an unknown executor subprocess 559 which transfers control to the error sequence 529.

As an alternative to using the metascript 400, individual device scripts may be input to the executor 550. In this case, common processing module 551 directs each individual device script to the appropriate subprocess 552, 554, 555, 557, or 559.

A description of a method of testing a communications network including a method of metascript decomposition will now be described with reference to FIGS. 6–9. In an embedding format used by the metascript language, commands for individual devices are encoded in a metascript command language which is decomposed into commands for the individual devices and additional scripts coordinate the execution of the individual device scripts may be created. FIGS. 7–9 will focus on embedding decomposition of the metascript. An example of an embedding decomposition of a metascript is given at the end of the specification incorporated herein by this reference. The example lists the input metascript 400, the execution script 402 ("output scripts file"), and output configuration files and device scripts included in BLT1 information 408 and BLT2 information 410 for BLT's 420 and 422.

Figure 6:
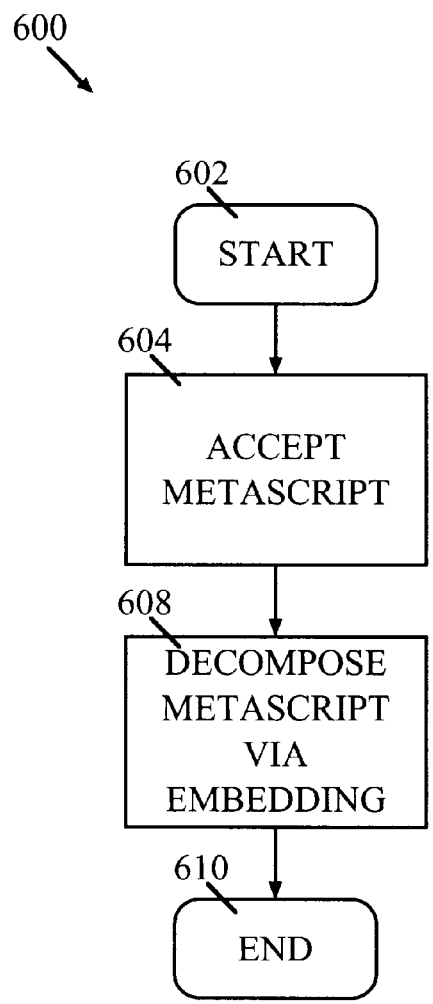
FIG. 6 is a flowchart illustrating an embodiment of a method of testing a cellular communications network in accordance with the present invention.

FIG. 6 is a flowchart illustrating an embodiment of a method 600 of testing a cellular communications network beginning at a step 602. Step 604 accepts the metascript 400. Step 608 decomposes the metascript via embedding. Thereafter, the method 600 ends at step 610.

FIG. 7 is a flowchart of a computer program illustrating in greater detail step 608 of decomposing the metascript 400 via embedding as shown in FIG. 6 beginning at a step 1000. To decompose the metascript 400, the step 608 interprets metascript lines as described above with reference to FIG. 5. Much of the interpreting is comparing parts of metascript lines with lists and tables by processes of elimination.

As illustrated in FIG. 7, step 608 checks the metascript 400 for errors and sets up output script files in step 1002. Step 1004 writes commands to appropriate output files, and step 1006 ends step 608. In some embodiments, as described below, steps 1002 and 1004 are performed in two separate readings of the metascript 400.

FIG. 8 is a flowchart of a computer program illustrating in greater detail step 1002 of error checking and setting-up output scripts of FIG. 7 beginning at a step 1100. Step 1102 reads a metascript line. Step 1002 its performs various error checks and sets up output script files depending upon whether a metascript line contains one of four groups of commands: a variable declaration, a declare device command or a device command, a start time command, or an embedded device command. Determining whether the metascript line has commands belonging to one of these four groups is essentially a process of elimination including four yes/no determinations: steps 1104, 1122, 1130, and 1136, described below.

Step 1104 determines whether the metascript line declares a variable. In the example metascript 400 at the end of the specification, these lines contain a "DeclareVar" command. If it does, step 1106 determines whether the device associated with the variable is in a list of "allowed" devices. The allowed devices are those capable of being controlled by the system test metacontroller 102 in a test arrangement. If the specified device is in the allowed list, step 1108 determines whether the device has been "registered" for the test to be performed on the cellular communications network. A "registered" device is one selected for a particular test arrangement. Step 1108 determines whether the device has been registered by comparing the device name against a list of registered devices for the particular test arrangement. All registered devices for particular test arrangement must be allowed, but not all allowed devices are required for each test arrangement. If the device has not been registered, step 1110 determines whether the variable being declared in the metascript line is associated with multiple devices. A variable associated with mutliple devices could result in an ambiguity in decomposing the metascript 400.

If the variable is not associated with multiple devices, step 1112 registers the variable. Step 1114 determines whether all lines of the metascript have been read. If they have been, step 1116 ends step 1002. Otherwise, control of step 1002 is returned to step 1102 to read another metascript line. If step 1110 determines that the variable is associated with multiple devices in the test arrangement, step 1118 outputs an error message. Then, step 1002 stops at step 1120.

If step 1108 determines that the device in the variable declaration has not been registered, steps 1118 and 1120 are performed. Similarly, if step 1106 determines that the device is not in the allowed device list, steps 1118 and 1120 are performed.

If step 1104 determines that the metascript line does not declare a variable, then step 1122 determines whether the metascript line is a declare device statement or a device command statement. In the example metascript 400 at the end of the specification, the declare device command is "DeclareDevice" having a name of a device as a variable. The DeclareDevice states that the named device is used in the test. A device command is a command for a particular test device such the GPIB's 412, 414, the CO simulator 416, the MALTS 418, or the load testers 420, 422. In the example metascript 400, device commands are denoted by "Device-Command."

If it is one of these types of statements, step 1124 determines whether the device is in the allowed list. If not, steps 1118 and 1120 are performed. Otherwise, step 1126 determines whether the device has been registered. If so, steps 1118 and 1120 are performed, since two devices have been registered with the same identification. Otherwise, step 1126 transfers control to step 1114 to determine whether all the lines of the metascript 400 have been read. If all the lines have been read, step 1002 ends at step 1116. If there are lines in the metascript 400 which have not been read, step 1002 returns to step 1102 to read another metascript line.

If step 1122 determines that neither a declare device nor a device command statement have been read, step 1128 checks associations of variables and devices. Step 1128 may include recursive processing of nested statements. In step 1128, each variable is checked with an associated device, and any conflicts are flagged. An example of such a conflict would be a variable that is associated with both an interactive device and a non-interactive device.

Step 1130 determines whether the metascript line contains a start time command. In the example metascript 400 at the end of the specification, the start command is "set start_time[getclock]." The start time command may be required to globally synchronize execution of the decomposed scripts for the interactive and non-interactive devices. If the metascript line contains a start time command, step 1132 determines whether the time has already been set. If it has, steps 1118 and 1120 are performed. Otherwise, step 1134 registers that a start time command has occurred. Control of step 1002 is then sent to step 1114 to determine whether all the lines have been read.

When step 1130 determines that a start time command has not been read, step 1136 determines whether the metascript line has an embedded device command. In the example metascript 400 at the end of the specification, "DeviceEmbed" denotes the embedded device commands. DeviceEmbed has two variables: a device name and a script associated with it, e.g. "Device Embed blt_1 blt_1.scr." If it does not, then the metascript line is not recognizable under the conditions specified for the particular test of the communications network, and steps 1118 and 1120 are performed. When an embedded device command is recognized by step 1136, step 1138 determines whether the device is registered. If the device has already been registered, step 1002 performs steps 1118 and 1120. When the device has not been registered, step 1140 registers an output script name corresponding to the device in the embedded device command in the metascript line. Step 1114 then determines whether all lines of the metascript have been read.

FIG. 9 is a flowchart of a computer program illustrating in greater detail the step 1004 of writing commands as shown in FIG. 7 beginning at a step 1200. Step 1004 performs various steps, described below, depending upon whether a metascript line contains one of three types of commands: a declare device command, an embedded device command, or a device command. Determining whether the metascript line has commands belonging to one of these three types is essentially a process of elimination including three yes/no determinations: steps 1204, 1212, and 1218, described below.

Step 1202 reads a metascript line, and step 1204 determines if the metascript line contains a device declaration command. If the metascript line declares a device, step 1206 writes a command contained in the declare device command to the output script file. If all lines of the metascript file have been read, step 1208 transfers control of step 1004 to step 1210 to end step 1004. Otherwise, step 1208 transfers control to step 1202 once again to read another metascript line.

When step 1204 determines that the metascript line does not contain a device declaration command, step 1212 determines whether the metascript line contains an embedded device command. When it does contain an embedded device command, step 1214 closes the output script corresponding to the device in the metascript line. Step 1216 then opens another metascript line for the device, and step 1208 determines whether all lines of the metascript file have been read.

When step 1212 answers "no," step 1218 determines whether the metascript line contains a device command. When it does, step 1220 reformats the command for the current device. The reformatting in step 1220 may include compiling the command in the device command statement. For example, if the corresponding device in the communications network requires a C code to operate, step 1220 may compile a command written in the C language. Step 1222 writes the reformatted command to the corresponding output script. Then, step 1208 determines whether all lines of the metascript file have been read.

If step 1218 determines that a device command has not been read on the metascript line, then step 1224 writes the line verbatim directly to the appropriate output script file. This could occur, for example, when particular devices compile or use statements which are identical to those in the metascript file. "If" and "while" control statements in the metascript language may be used to place "if" and "while" statements in individual scripts for individual devices by the step 1224. Step 1208 then determines whether all lines of the metascript file have been read.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be within the scope of the following claims.

[QCPA546]

20
INPUT METASCRIPT FILE 400 (EMBEDDING)

```
###################################################################
5   # File : embed.stm
###################################################################

###################################################################
    # Instantiate devices "blt-1" and "blt-2"
10  # Send device scripts executable to   devices "blt-1" and "blt-2"
    # Load device scripts executable onto devices "blt-1" and "blt-2"
    # Run  device scripts executable on   devices "blt-1" and "blt-2".
###################################################################

15  DeclareVar BLT blt_cnt

DeclareDevice blt-1
    DeclareDevice blt-2
    DeviceCommand blt-1 send blt_1
20  DeviceCommand blt-2 send blt_2
    DeviceCommand blt-1 load blt_1
    DeviceCommand blt-2 load blt_2
    DeviceCommand blt-1 run
    DeviceCommand blt-2 run
25

###################################################################
    # Align STMC time with BLT time as much as possible.
    # User is required to appropriately place this line in the scripts.
    # Decomposer should complain if could find this line anywhere.
30  ################################################################### set start_time [getclock]

#############################################################
35  # Indicates filename for blt-1 device configuration scripts.
###################################################################

DeviceEmbed blt-1 blt_1.cfg
    DeviceEmbed blt-2 blt_2.cfg
```

[QCPA546]

21

```
###################################################################
# Instantiate device "sst-1"
# Load device scripts executable onto device "sst-1".
# Run device scripts executable on  device "sst-1".
###################################################################

DeclareVar SST sst_cnt

DeclareDevice sst-1
DeviceCommand sst-1 send sst_test
DeviceCommand sst-1 run sst_test

###################################################################
# Instantiate devices "hp438a-1" and "hp438a-2"
###################################################################

DeclareVar HP438A hp438a_cnt

DeclareDevice hp438a-1
DeclareDevice hp438a-2

###################################################################
# Declare association of variable "sector_conf" with devices of type "BLT", also its
# type "BS_Info" in device scripts, along with its initial values.
# The decomposer will translate the following STMC "DeclareVar" command
# into BLT device scripts in output files "blt_1.cfg" and"blt_2.cfg".

#     BS_Info sector_conf[8] ={
{ TRUE, 2.0, 1.0, 15.0, 0.0, 180.0, 15.0 },
{ FALSE, 1.0, 1.0, 15.0, 140.0, 120.0, 10.0 },
{ FALSE, 1.0, 1.0, 15.0, 260.0, 120.0, 10.0 },
{ FALSE, 0.5, 0.0, 15.0, 180.0, 180.0, 15.0 },
{ FALSE, -2.0, 2.0, 15.0, 120.0, 120.0, 10.0 },
{ FALSE, -2.0, 2.0, 15.0, 240.0, 120.0, 10.0 },
{ TRUE, 2.0, -1.0, 15.0, 180.0, 180.0, 15.0 },
#        { FALSE, 0.0, -4.0, 15.0, 270.0, 120, 10.0 },
};

```

[QCPA546]

22
without copying into output file "embed.sto".
##############################################################

DeclareVar BLT sector_conf BS_Info {
    { TRUE   2.0  1.0 15.0   0.0 180.0 15.0 }
    { FALSE  1.0  1.0 15.0 140.0 120.0 10.0 }
    { FALSE  1.0  1.0 15.0 260.0 120.0 10.0 }
    { FALSE  0.5  0.0 15.0 180.0 180.0 15.0 }
    { FALSE -2.0  2.0 15.0 120.0 120.0 10.0 }
    { FALSE -2.0  2.0 15.0 240.0 120.0 10.0 }
    { TRUE   2.0 -1.0 15.0 180.0 180.0 15.0 }
    { FALSE  0.0 -4.0 15.0 270.0 120.0 10.0 } }

##############################################################
The decomposer will translate the following STMC scripts into BLT
device scripts in output files "blt_1.cfg" and "blt_2.cfg".

SetMaxDistance( 10.0, 10.0 );
SetOperatingFreq( OP_FREQ_800MHZ );
VPhoneSetPrefix ("677");

without copying into output file "embed.sto".
##############################################################

DeviceCommand BLT SetMaxDistance 10.0 10.0
DeviceCommand BLT SetOperatingFreq OP_FREQ_800MHZ
DeviceCommand BLT VPhoneSetPrefix "677"

##############################################################
The decomposer will translate the following STMC scripts into BLT
scripts in output files "blt_1.cfg" and "blt_2.cfg"

int vv;
MS_TotalSet(1*16);
int index = 1;
for (vv = 1; vv <= 1; vv++)   {
for (int ms = 1; ms <=16; ms++) {
MS_AttributeSet(index, MS_VVPort, vv);
MS_AttributeSet(index, MS_MSPort, ms);

[QCPA546]

23

```
#       index++;
}
}
MS_Assign();
SetMobileLogMask(1, 0x000001F0);

# and interactive STMC scripts into output file "embed.sto".

#   set index 1
for {set vv 1} {$vv <= 2} {incr vv 1} {
for {set ms 1} {$ms <= 16 } {incr ms 1} {
#       incr index 1
}
if {$vv = 1} {
DeviceCommand hp438a-1 write CL98.5EN
}
#     elseif {$vv = 2} {
#       DeviceCommand hp438a-2 write CL98.5EN
}
}

# Decomposition cases covered :

#   1. Multi and mixed device scripts decomposition.
#   2. "if" control flow statement.
#   3. "while" control flow statement.
#   4. "for" control flow statement, nested,
#   5. with no device in set up, and
#         interactive devices in body. (OK)
#         embedded devices in body. (OK if separable)
#         mixed devices in body. (OK if separable)
#         no device in body. (OK)
#   6. Auto-declaration of embedded device associated variables.

###################################################################

DeviceCommand BLT MS_TotalSet 1*16
set index 1
for {set vv 1} {$vv <= 2} {incr vv 1} {
```

[QCPA546]

24
```
for {set ms 1} {$ms <= 16 } {incr ms 1) {
    DeviceCommand blt-1 MS_AttributeSet $index MS_VVPort $vv
    DeviceCommand blt-1 MS_AttributeSet $index MS_MSPort $ms
    DeviceCommand blt-2 MS_AttributeSet $index MS_VVPort $vv
    DeviceCommand blt-2 MS_AttributeSet $index MS_MSPort $ms
    incr index 1
}
if {$vv = 1} {
    DeviceCommand hp438a-1 write CL98.5EN
}
else if {$vv = 2} {
    DeviceCommand hp438a-2 write CL98.5EN
}
}
while {$vv < 10} {
    incr vv 1
}
DeviceCommand BLT MS_Assign
DeviceCommand BLT SetMobileLogMask 1 0x000001F0

##################################################################
# The decomposer will translate the following STMC scripts into BLT
scripts in output files "blt_1.cfg" and "blt_2.cfg"

#     BS_SetAll( sector_conf );

# without copying into output file "embed.sto".
##################################################################

DeviceCommand BLT BS_SetAll sector_conf

##################################################################
# Indicates filename for blt-1 and blt-2 devices operation scripts.
##################################################################

DeviceEmbed blt-1 blt_1.scr
DeviceEmbed blt-2 blt_2.scr

##################################################################
```

[QCPA546]

25

```
# Adjust sensor B calibration factor of devices "hp438a-1" and
# "hp438a-2" to 99% to compensates for mismatch losses and effective
# efficiency over the frequency range of the power sensor.
########################################################################

DeviceCommand hp438a-1 write KB99EN
DeviceCommand hp438a-2 write KB99EN

########################################################################
# The decomposer will translate the following STMC scripts into BLT
# scripts in output files "blt_1.scr" and "blt_2.scr"

#       VVanChgLocation(1, 2.5, 1.5);
VVanChgDirection(1, 180.0);
VVanChgSpeed(1, 100.0);
VVanChgArcRadius(1, 2.0);

VVanChgLocation(2, 0.0, -1.0);
VVanChgLocation(3, 1.0, 0.0);
VVanChgLocation(4, -1.0, 0.0);

int index = 1;

WaitUntil( 100 );
for (int i = 1; i <= 1; i++) {
MobileOrigCall(index, "6585501", MARKOV_OPTION);
Wait(20);
index++;
Wait(20);
}

WaitUntil( 200 );

for (i = 1; i <= 16; i++) {
MobileTermCall( i );
Wait(20);
}

# with the following STMC scripts into output file "embed.sto".
```

[QCPA546]

```
                                              26

#      WaitClock 100 $start_time
for {set i 1} {$i <= 1} {incr i 1} {
#          WaitDuration 20
#          WaitDuration 20
}

WaitClock 200 $start_time

set i 1
while {$i <= 16} {
WaitDuration 20
incr i 1
}

# Decomposition cases covered :

#      1. BLT script "Wait( time )" timing coordination.
#      2. BLT script "WaitUntil( time )" timing coordination.
#      3. STMC script "WaitClock time <relative variable> timing
#         coordination.
#      4. STMC script "WaitDuration time" timing coordination.

################################################################

DeviceCommand BLT VVanChgLocation 1  2.5 1.5
DeviceCommand BLT VVanChgDirection 1 180.0
DeviceCommand BLT VVanChgSpeed    1 100.0
DeviceCommand BLT VVanChgArcRadius 1  2.0

DeviceCommand BLT VVanChgLocation 2  0.0 -1.0
DeviceCommand BLT VVanChgLocation 3  1.0  0.0
DeviceCommand BLT VVanChgLocation 4 -1.0  0.0 set index 1

DeviceCommand BLT WaitUntil 100
for {set i 1} {$i <= 1} {incr i 1} {
    DeviceCommand BLT MobileOrigCall $index "6585501" MARKOV_OPTION
```

[QCPA546]

27
```
        DeviceCommand BLT Wait 20
        incr index 1
        WaitDuration 20
    }

WaitClock 200 $start_time set i 1
    while {$i <= 16} {
        DeviceCommand BLT MobileTermCall $i
        DeviceCommand BLT Wait 20
        incr i 1
    }

######################################################################
    # The decomposer will only allow from the following STMC scripts into "embed.sto"
    #
    #     switch $sst_cnt {
    #        1 -
    #        2 -
    #        3 {set cnt 3}
    #        4 {set hp438a_cnt 4}
    #     }
    #
    # Decomposition cases covered :
    #
    #     1. "switch" control flow statement.
    #     2. Interactive devices in setup, and
    #           no device in body. (OK)
    #           interactive devices in body. (OK)
    #           embedded devices in body. (NO)
    #           mixed devices in body. (NO)
    #
    ###################################################################### switch $sst_cnt {
        1 -
        2 -
        3 {set cnt 3}
```

[QCPA546]

28
```
    4 {set hp438a_cnt 4}
    5 {set blt_cnt 5}
    6 {set hp438a_cnt 6; set blt_cnt 6}
}

#############################################################
# The decomposer will only allow from the following STMC scripts into "embed.sto"

#     if {blt_1_cnt < 10} {
set cnt 10
}
if {blt_1_cnt < 30} {
set blt_1_cnt 30
}

# Decomposition cases covered :

#     1. Embedded devices in setup, and
#          no device in body. (OK)
#          interactive devices in body. (NO)
#          embedded devices in body. (OK if exact match)
#          mixed devices in body. (NO)

############################################################# if {blt_1_cnt < 10} {
   set cnt 10
}
if {blt_1_cnt < 20} {
   set hp438a_cnt 20
}
if {blt_1_cnt < 30} {
   set blt_1_cnt 30
}
if {blt_1_cnt < 40} {
   set blt_2_cnt 40
}
if {blt_cnt < 50} {
   set hp438a_cnt 50
```

[QCPA546]

29
   set blt_cnt 50
}

#############################################################
The decomposer will not allow the following STMC scripts.

Decomposition cases covered :

1. Mixed devices in setup.

############################################################# set blt_1_cnt 1
set blt_2_cnt 1
if {(blt_1_cnt < 10) && (blt_2_cnt < 10)} {
    set cnt 10
}

#############################################################
The decomposer will close all "blt_1.cfg", "blt_1.scr", and
"blt_2.cfg", and "blt_2.scr" files after appending "}".
#############################################################

EOF

---------------------------------------------------------------------

OUTPUT SCRIPTS FILE. EXECUTION SCRIPT 402. PRE-PROCESSED METASCRIPT 520. (EMBEDDING)

DeclareDevice blt-1
DeclareDevice blt-2
DeviceCommand blt-1 send blt_1
DeviceCommand blt-2 send blt_2
DeviceCommand blt-1 load blt_1
DeviceCommand blt-2 load blt_2
DeviceCommand blt-1 run

[QCPA546]

```
                                                     30
        DeviceCommand blt-2 run set start_time [getclock]

5      DeclareDevice sst-1
        DeviceCommand sst-1 send sst_test
        DeviceCommand sst-1 run  sst_test DeclareDevice hp438a-1
10      DeclareDevice hp438a-2 set index 1
        for {set vv 1} {$vv <= 2} {incr vv 1} {
          for {set ms 1} {$ms <= 16 } {incr ms 1} {
15           incr index 1
          }
          if {$vv = 1} {
             DeviceCommand hp438a-1 write CL98.5EN
          }
20        elseif {$vv = 2} {
             DeviceCommand hp438a-2 write CL98.5EN
          }
        }

25      DeviceCommand hp438a-1 write KB99EN
        DeviceCommand hp438a-2 write KB99EN WaitClock 100 $start_time
        for {set i 1} {$i <= 1} {incr i 1} {
30         WaitDuration 20
           WaitDuration 20
        }

WaitClock 200 $start_time
35
        set i 1
        while {$i <= 16} {
          WaitDuration 20
          incr i 1
```

[QCPA546]

31
}

```
       switch $sst_cnt {
         1 -
         2 -
         3 {set cnt 3}
         4 {set hp438a_cnt 4}
       } if {blt_1_cnt < 10} {
          set cnt 10
       }
       if {blt_1_cnt < 30} {
          set blt_1_cnt 30
       }
```

---------------------------------------------------------------------
--------------------

BLT CONFIGURATION FILE "blt_1.cfg" IN BLT1 INFORMATION 420. TARGET FILE 526.

```
#include "bltconfg.h"
#include "bs_type.h"
#include "ms_type.h"

BEGIN_CONFIG(blt_1)
{

BS_Info sector_conf[8] ={
      { TRUE,  2.0,  1.0, 15.0,   0.0, 180.0, 15.0 },
      { FALSE, 1.0,  1.0, 15.0, 140.0, 120.0, 10.0 },
      { FALSE, 1.0,  1.0, 15.0, 260.0, 120.0, 10.0 },
      { FALSE, 0.5,  0.0, 15.0, 180.0, 180.0, 15.0 },
      { FALSE, -2.0, 2.0, 15.0, 120.0, 120.0, 10.0 },
      { FALSE, -2.0, 2.0, 15.0, 240.0, 120.0, 10.0 },
      { TRUE,  2.0, -1.0, 15.0, 180.0, 180.0, 15.0 },
      { FALSE, 0.0, -4.0, 15.0, 270.0, 120,   10.0 },
   };
```

[QCPA546]

32

```
   SetMaxDistance( 10.0, 10.0 );
   SetOperatingFreq( OP_FREQ_800MHZ );
   VPhoneSetPrefix ("677");

int vv;
    MS_TotalSet(1*16);
   int index = 1;
   for (vv = 1; vv <= 1; vv++) {
     for (int ms = 1; ms <=16; ms++) {
        MS_AttributeSet(index, MS_VVPort, vv);
        MS_AttributeSet(index, MS_MSPort, ms);
        index++;
     }
   }
   MS_Assign();
   SetMobileLogMask(1, 0x000001F0);

BS_SetAll( sector_conf );

}
```
---

BLT SCRIPTS FILE "blt_1.scr" IN BLT1 INFORMATION 420. DEVICE SCRIPT 525.

```
#include "bltcmds.h"

BEGIN_TEST(blt_1)
{
   VVanChgLocation(1, 2.5, 1.5);
   VVanChgDirection(1, 180.0);
   VVanChgSpeed(1, 100.0);
   VVanChgArcRadius(1, 2.0);

VVanChgLocation(2, 0.0, -1.0);
   VVanChgLocation(3, 1.0, 0.0);
   VVanChgLocation(4, -1.0, 0.0);
```

[QCPA546]

33
```
    int index = 1;

WaitUntil( 100 );
     for (int i = 1; i <= 1; i++) {
         MobileOrigCall(index, "6585501", MARKOV_OPTION);
        Wait(20);
       index++;
        Wait(20);
     }

WaitUntil( 200 );

for (i = 1; i <= 16; i++) {
        MobileTermCall( i );
        Wait(20);
     }

}
```
---

BLT SCRIPTS FILE "blt_2.cfg" IN BLT2 INFORMATION 422. TARGET FILE 528.

```
#include "bltconfg.h"
#include "bs_type.h"
#include "ms_type.h"

BEGIN_CONFIG(blt_2)
{

BS_Info sector_conf[8] ={
       { TRUE, 2.0, 1.0, 15.0, 0.0, 180.0, 15.0 },
       { FALSE, 1.0, 1.0, 15.0, 140.0, 120.0, 10.0 },
       { FALSE, 1.0, 1.0, 15.0, 260.0, 120.0, 10.0 },
       { FALSE, 0.5, 0.0, 15.0, 180.0, 180.0, 15.0 },
       { FALSE, -2.0, 2.0, 15.0, 120.0, 120.0, 10.0 },
       { FALSE, -2.0, 2.0, 15.0, 240.0, 120.0, 10.0 },
       { TRUE, 2.0, -1.0, 15.0, 180.0, 180.0, 15.0 },
```

[QCPA546]

```
                                            34
     { FALSE, 0.0, -4.0, 15.0, 270.0, 120, 10.0 },
};

SetMaxDistance( 10.0, 10.0 );
  SetOperatingFreq( OP_FREQ_800MHZ );
  VPhoneSetPrefix ("677");

int vv;
  MS_TotalSet(1*16);
  int index = 1;
  for (vv = 1; vv <= 1; vv++) {
     for (int ms = 1; ms <=16; ms++) {
        MS_AttributeSet(index, MS_VVPort, vv);
        MS_AttributeSet(index, MS_MSPort, ms);
        index++;
     }
  }
  MS_Assign();
  SetMobileLogMask(1, 0x000001F0);

BS_SetAll( sector_conf );

}
```
------------------------------------------------

BLT SCRIPTS FILE "blt_2.scr" IN BLT2 INFORMATION 422. DEVICE SCRIPT 527.

```
#include "bltcmds.h"

BEGIN_TEST(blt_2)
{

VVanChgLocation(1, 2.5, 1.5);
  VVanChgDirection(1, 180.0);
  VVanChgSpeed(1, 100.0);
  VVanChgArcRadius(1, 2.0);

VVanChgLocation(2, 0.0, -1.0);
```

[QCPA546]

```
                                        35
    VVanChgLocation(3, 1.0, 0.0);
    VVanChgLocation(4, -1.0, 0.0);

int index = 1;

WaitUntil( 100 );
    for (int i = 1; i <= 1; i++) {
        MobileOrigCall(index, "6585501", MARKOV_OPTION);
        Wait(20);
        index++;
        Wait(20);
    }

WaitUntil( 200 );

for (i = 1; i <= 16; i++) {
        MobileTermCall( i );
        Wait(20);
    }

}
```

What is claimed is:

1. A system test metacontroller comprising:
   an input device accepting a metascript containing commands to control a plurality of devices which are part of a test arrangement wherein at least one of said devices is an interactive device responsive to interactive programming instructions and at least another of said plurality of said devices is non-interactive; and
   a processor decomposing said metascript into instructions capable of driving said interactive device and said non-interactive device.

2. A system test metacontroller as in claim 1 wherein said processor determines which of said plurality of devices is interactive and which is non-interactive by sensing identification signals received from each of said plurality of devices.

3. A system test metacontroller as in claim 2 wherein said processor sends query signals to said interactive device and to said non-interactive device wherein said identification signals include responses to said query signals.

4. A system test metacontroller as in claim 2 wherein said processor writes said metascript based on said identification signals.

5. A system test metacontroller as in claim 1 said processor compiles a portion of said metascript for said non-interactive subsystem.

6. A system test metacontroller as in claim 1 wherein said processor interprets a portion of the metascript containing instructions to control the interactive device.

7. A system test metacontroller as in claim 1 said processor generates raw data in response to said instructions.

8. A system test metacontroller as in claim 7 further comprising a memory wherein said processor stores said raw data in said memory.

9. A system test metacontroller as in claim 7 wherein said processor analyzes said raw data.

10. A system test metacontroller as in claim 9 wherein said processor analyzes said raw data based on an execute command received from said input device.

11. A system test metacontroller as in claim 10 wherein said analyzing includes integrating said raw data.

12. A system test metacontroller as in claim 11 wherein said processor writes a second metascript based on said results of said analyzing.

13. A system test metacontroller as in claim 12 wherein said processor decomposes said second metascript, generates second raw data in response to instructions in said second metascript, and analyzes said second raw data.

14. A system test metacontroller as in claim 9 wherein said analyzing includes comparing said raw data with other data.

15. A system test metacontroller as in claim 14 wherein said other data includes previously obtained raw data.

16. A system test metacontroller as in claim 14 wherein said other data includes threshold data.

17. A system test metacontroller as in claim 9 processor outputs results of said analyzing.

18. A system test metacontroller as in claim 7 wherein said processor executes said instructions.

19. A system test metacontroller as in claim 18 wherein said processor begins executing said instructions for said non-interactive device before beginning to execute said instructions for said interactive device.

20. A system test metacontroller as in claim 18 wherein said processor begins executing said instructions for said non-interactive device and said instructions for said interactive device at approximately the same time.

21. A system test metacontroller as in claim 18 wherein said processor decomposes said metascript into a command script in a command language, and wherein the processor sends said command script to a selected device of said plurality of devices.

22. A method of testing comprising:
    accepting a metascript containing commands to control a plurality of devices which are part of a test arrangement wherein at least one of said devices is an interactive device responsive to interactive programming instructions and at least another of said plurality of said devices is non-interactive; and
    decomposing said metascript into instructions capable of driving said interactive device and said non-interactive device.

23. A method as in claim 22 further determining which of said plurality of devices is interactive and which is non-interactive by sensing identification signals received from each of said plurality of devices.

24. A method as in claim 23 wherein said determining includes sending query signals to said interactive device and to said non-interactive device wherein said identification signals include responses to said query signals.

25. A method as in claim 22 further comprising writing said metascript based on said identification signals.

26. A method as in claim 22 further comprising compiling a portion of said metascript for said non-interactive device.

27. A method as in claim 22 wherein said decomposing include interpreting a portion of the metascript containing instructions to control the interactive device.

28. A method as in claim 22 further comprising generating raw data in response to said instructions.

29. A method as in claim 28 further comprising storing said raw data in a memory.

30. A method as in claim 28 further comprising analyzing said raw data.

31. A method as in claim 30 wherein said analyzing is based on an execute command received from said metascript.

32. A method as in claim 30 wherein said analyzing includes integrating said raw data.

33. A method as in claim 30 wherein said wherein said analyzing includes comparing said raw data with other data.

34. A method as in claim 33 wherein said other data includes previously obtained raw data.

35. A method as in claim 33 wherein said other data includes threshold data.

36. A method as in claim 30 further comprising outputting results of said analyzing.

37. A method as in claim 32 further comprising writing a second metascript based on said results of said analyzing.

38. A method as in claim 37 further comprising repeating said accepting, said decomposing, and said analyzing for said second metascript.

39. A method as in claim 28 wherein said generating includes executing said instructions.

40. A method as in claim 39 wherein said executing begins executing said instructions for said non-interactive device before beginning to execute said instructions for said interactive device.

41. A method as in claim 39 wherein said executing begins executing said instructions for said non-interactive device and said instructions for said interactive device at approximately the same time.

42. A method as in claim 39 wherein said decomposing results in a command script in a command language, said method further comprising:
    sending said command script to a selected device of said plurality of devices wherein said executing includes executing said command script.

* * * * *